US008781726B2

(12) United States Patent
Clark

(10) Patent No.: US 8,781,726 B2
(45) Date of Patent: Jul. 15, 2014

(54) METHOD AND SYSTEM FOR ADJUSTING A DEMAND-RESPONSE TRANSIT SCHEDULE

(75) Inventor: Jarrod Gregory Clark, Burlington (CA)

(73) Assignee: Trapeze Software Inc., Mississauga, Ontario ( * ) Notice: Subject to any disclaimer, the term of this patent is extended or adjusted under 35 U.S.C. 154(b) by 0 days.

(21) Appl. No.: 13/572,425

(22) Filed: Aug. 10, 2012

(65) Prior Publication Data

US 2013/0218455 A1    Aug. 22, 2013

(30) Foreign Application Priority Data

Feb. 16, 2012    (CA) ..................................... 2768578

(51) Int. Cl.
*G01C 21/34*    (2006.01)
(52) U.S. Cl.
USPC ........................................................ 701/411

(58) Field of Classification Search
USPC ........................................................ 701/411
See application file for complete search history.

(56) References Cited

U.S. PATENT DOCUMENTS

| 5,604,676 | A  | * | 2/1997  | Penzias ......................... 705/417 |
| 7,840,427 | B2 | * | 11/2010 | O'Sullivan ........................ 705/6 |
| 8,442,848 | B2 | * | 5/2013  | Myr ................................. 705/6 |
| 8,469,153 | B2 | * | 6/2013  | Wu ................................ 187/383 |
| 2011/0184774 | A1 | * | 7/2011  | Forstall et al. ............... 705/7.25 |
| 2012/0253878 | A1 | * | 10/2012 | Forstall ........................ 705/7.22 |
| 2013/0158846 | A1 | * | 6/2013  | Zhang ........................... 701/117 |

\* cited by examiner

*Primary Examiner* — Mary Cheung
*Assistant Examiner* — Brian P Sweeney
(74) *Attorney, Agent, or Firm* — McMillan LLP

(57) ABSTRACT

A method and system for adjusting a demand-response transit schedule is provided. A demand-response transit schedule is reviewed during performance of the demand-response transit schedule. The fact that the demand-response transit schedule may need to be adjusted is detected. The demand-response transit schedule is then adjusted.

12 Claims, 3 Drawing Sheets

METHOD AND SYSTEM FOR ADJUSTING A DEMAND-RESPONSE TRANSIT SCHEDULE

FIELD OF THE INVENTION

The present invention relates generally to demand-response transit. More particularly, the present invention relates to a method and system for adjusting a demand-response transit schedule.

BACKGROUND OF THE INVENTION

Demand-response transit is generally known, and is flexible on-demand passenger transportation that does not follow fixed routes or schedules. Such transit service is typically operated by public transit organizations and is often fully demand-responsive transport, wherein on-demand call-up door-to-door service from any origin to any destination in a service area is offered. An example of demand-response transit is paratransit, that is provided to serve people in the metropolitan area that are physically-challenged, who are provided transportation services in accordance with an insurance program of some type, etc. Typically vans or mini-buses are used to provide demand-response transit service, but share taxis and jitneys can also be used.

The scheduling of demand-response transit can be challenging. People request trips by specifying a point of departure, a destination, and a desired departure day and time. Transit providers providing demand-response transit face a fluctuating demand for trips from day to day and from hour to hour. This makes provisioning such service difficult, as it is undesirable to over-provision, which can be quite costly. Scheduling driver/vehicle runs to service the requested trips can be difficult due to the arbitrary nature of the trips requested. Further, while, in some cases, trip requests are received well in advance of the desired departure date, in other cases, they are received the day before or on the desired departure date.

Often, a pre-set demand-response transit schedule is deemed inefficient or fails for one of many reasons. This can occur, for example, when a driver encounters unexpected traffic and, as a result, will likely cause the driver to arrive at stops along a run at a time that is deemed unacceptable. When a passenger is not present at a pick-up location (i.e., a "no-show"), a driver will no longer necessarily have to visit the destination for the trip scheduled for that passenger, and, as a result, the driver will have unscheduled slack during his run. Once such schedules are set, however, manual adjustments can be made, but are cumbersome, tedious and typically result in a less-than-ideal solution.

It is therefore an object of the invention to provide a novel method and system for adjusting a demand-response transit schedule.

SUMMARY OF THE INVENTION

In accordance with an aspect of the invention, there is provided a method for adjusting a demand-response transit schedule, comprising:

reviewing a demand-response transit schedule during performance of said demand-response transit schedule;

detecting that said demand-response transit schedule may need to be adjusted; and adjusting said demand-response transit schedule.

The detecting can include determining how the demand-response transit schedule fits received trips requests for a time period covered by the demand-response transit schedule. The determining can include:

calculating scores for runs of said demand-response transit schedule; and determining if any of said scores for said runs score exceeds a threshold.

Each of the scores is a weighted value of characteristics of a corresponding one of the runs. The characteristics can include at least one of: distance, time, passenger on-board time, back-tracking, and slack time. The characteristics can include at least one of: arriving early for a trip, arriving late for a trip, exceeding a maximum on-board time for a passenger, hostage time, exceeding a vehicle capacity, and exceeding a seating capacity.

The detecting can include:

calculating a score for said demand-response transit schedule; and determining if said score exceeds a threshold.

The characteristics can include at least one of: distance, time, passenger on-board time, back-tracking, slack time, and the number of pull-outs. The characteristics can include at least one of: arriving early for a trip, arriving late for a trip, exceeding a maximum on-board time for a passenger, hostage time, exceeding a vehicle capacity, and exceeding a seating capacity.

According to another aspect of the invention, there is provided a computer system for adjusting a demand-response transit schedule, comprising:

storage storing a demand-response transit schedule and computer-executable instructions;

a processor executing said computer-executable instructions and reviewing a demand-response transit schedule during performance of said demand-response transit schedule, detecting that said demand-response transit schedule may need to be adjusted, and adjusting said demand-response transit schedule.

The processor can determine how the demand-response transit schedule fits received trips requests for a time period covered by the demand-response transit schedule. The processor can calculate scores for runs of the demand-response transit schedule, and determine if any of the scores for the runs score exceeds a threshold. Each of the scores can be a weighted value of characteristics of a corresponding one of the runs. The characteristics can include at least one of: distance, time, passenger on-board time, back-tracking, and slack time. The characteristics can include at least one of: arriving early for a trip, arriving late for a trip, exceeding a maximum on-board time for a passenger, hostage time, exceeding a vehicle capacity, and exceeding a seating capacity.

The processor can calculate a score for the demand-response transit schedule, and determine if the score exceeds a threshold. The characteristics can include at least one of: distance, time, passenger on-board time, back-tracking, slack time, the number of pull-outs. The characteristics can include at least one of: arriving early for a trip, arriving late for a trip, exceeding a maximum on-board time for a passenger, hostage time, exceeding a vehicle capacity, exceeding a seating capacity.

BRIEF DESCRIPTION OF THE DRAWINGS

Embodiments will now be described, by way of example only, with reference to the attached Figures, wherein.

DETAILED DESCRIPTION OF THE EMBODIMENTS

Demand-response transit schedules are generally generated in advance for each day. Trip requests received for the particular day are registered. The trip requests include a desired departure time and location, referred to as a point of departure, a destination and any special requirements that may exist for the requested trip. For example, some passengers can be assisted from a wheelchair to seating, some may not be able to leave their wheelchair, and others may be able walk on and off a vehicle without assistance. A schedule of runs is then generated to service the requested trips. A run represents the travel of a vehicle from pull-out of a vehicle depot to pull-in. Typically, the schedule is "optimized" based on expected travel times, the number of vehicle pull-outs required to service the trips, the amount of time passengers spend on vehicles, the fit of the schedule to the requested pick-up and drop-off times requested by the client, etc.

A daily schedule consists of one or more vehicle/driver itineraries, referred to as "runs". A run consists of, but not limited to, the following attributes:
  requested start and end times;
  garage pull-in and pull-out assignments (i.e., runs);
  vehicle assignment and capacity configuration;
  driver assignment and capability within service area; and
  defined service areas.

In addition, a driver itinerary consists of, but not limited to, the following scheduled events:
  passenger pick-ups and drop-offs
  driver breaks
  garage pull-out and pull-in During the course of the day, the schedule can become less than optimal/unacceptable for a number of reasons. As drivers encounter unexpected traffic or a client is late to a scheduled-pick-up, they may no longer be able to make a particular pick-up of a client within an acceptable time window. If a client does not show up for a scheduled pick-up or cancels the trip during the course of the day, the driver no longer has to complete the drop-off event (and the pick-up event in the later example) and, as a result, may have some flexibility introduced into their itinerary that may be better used by serving a trip presently scheduled for another vehicle which may be running slightly late. When a schedule is being generated, human intervention may introduce some poor scheduling decisions that result in a less-than-optimal schedule.

By monitoring the schedule during run-time (that is, during the course of the day) for inefficiencies introduced as a result of external events or a schedule that is not optimal and adjusting the schedule to re-optimize it during run-time, the schedule may be better tailored to the actual events and not just the scheduled events that occur during a day. For example, trips can be reallocated from one run to another. Other trips may be bumped to taxi service. As a result, the adjusted schedule increases driver schedule adherence (and, thus, passenger satisfaction) and overall scheduling efficiency and decreases overall operating costs.

Figure 1:
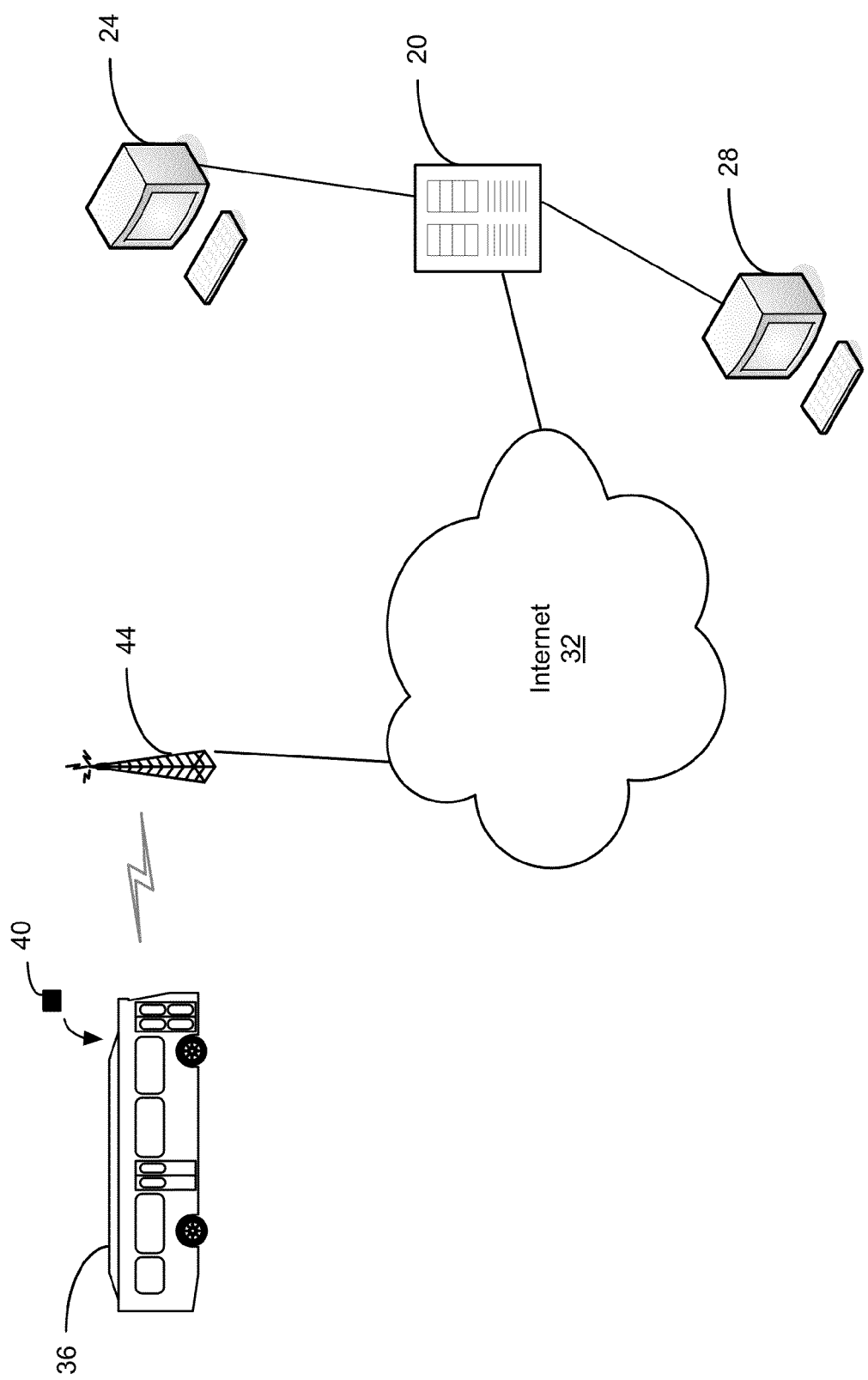
FIG. 1 shows a high-level architecture of a system for adjusting a demand-response transit schedule in accordance with an embodiment of the invention and its operating environment.

A scheduling server 20 for adjusting a demand-response transit schedule and its operating environment in accordance with an embodiment of the invention is shown in FIG. 1. The scheduling server 20 is shown in communication with a scheduling client computer 24 and a reservation computer 28 via a private network. The scheduling server 20 is also coupled to a large, public communications network, such as the Internet 32. The scheduling client computer 24 and the reservation computer 28 can also be coupled to the scheduling server 20 via the Internet 32. The scheduling server 20 is a relatively-high performance computer as it performs almost all of the processing. The scheduling client computer 24 and the reservation computer 28 can be any general-purpose computer executing either a client software interface or a web browser for communicating with the scheduling server 20. The scheduling client computer 24 enables a scheduling administrator to interact with the scheduling server 20 to set its configuration, monitor its operation, etc. The reservation computer 28 enables a service representative referred to as a "reservation agent" who receives and registers trips from clients, and communicates the scheduling of trips to the clients.

A transit vehicle 36 is also shown. The transit vehicle 36 has an on board unit ("OBU") 40, commonly referred to as a "black box", that collects and transmits automatic vehicle location ("AVL") data to the scheduling server 20. The OBU 40 includes an engine interface, such as a controller area network bus ("CANbus") interface, for receiving metrics from the engine. The metrics include the speed of the vehicle, the distance traveled (odometer deltas), fuel usage, brake pedal position, throttle position and idle time. A global positioning system ("GPS") module of the OBU 40 registers the geolocation, as latitude and longitude coordinates, of the OBU 40 and, hence, the vehicle 36 in which the OBU 40 is installed. In addition, the OBU 40 has a user interface that includes a touch panel, and storage. The OBU 40 receives an itinerary from the scheduling server 20 and stores it in storage. The touch panel then presents the itinerary, or a portion thereof, to a driver to direct the driver along a run to provide a set of trips to passengers. The touch panel also includes a set of soft keys that allow the driver to indicate that a passenger has been picked up, is a no-show, etc. The OBU 40 also includes a cellular communications interface for communicating with the scheduling server 20 over the Internet 32 via a cellular base station 44. The cellular base station 44 is coupled to the Internet 32 via a number of intermediate proxies and servers that form part of the infrastructure of a cellular communications carrier (not shown). The OBU 40 transmits the AVL data, which includes the time and date, geolocation, speed and direction of the vehicle, together with any inputs received from the driver, to the scheduling server 20 at regular time intervals to enable the scheduling server 20 to have relatively-current knowledge of the location of the transit vehicle 36. Further, the OBU 40 receives itineraries or revisions thereto from the scheduling server 20 via the cellular communications interface.

The scheduling server 24 aggregates the AVL and other data received from the OBUs 36 on the vehicles, together with other information provided from operational dispatch when one or more of the following events occurs, and forwards the information to the scheduling client computer 24 for presentation to the scheduling administrator:
  modifying times of scheduled work assignment to reflect service demands;
  real time operational events such as accidents, incidents & vehicle delays;
  driver and vehicle assignments (e.g., driver and vehicle assignments are changed when a driver calls in sick, a vehicle breaks down, or unscheduled service needs to be met); and cancellation of trips (changes to the scheduled service based on events such as lack of drivers, equipment, inclement weather or other service day incidents).

Figure 2:
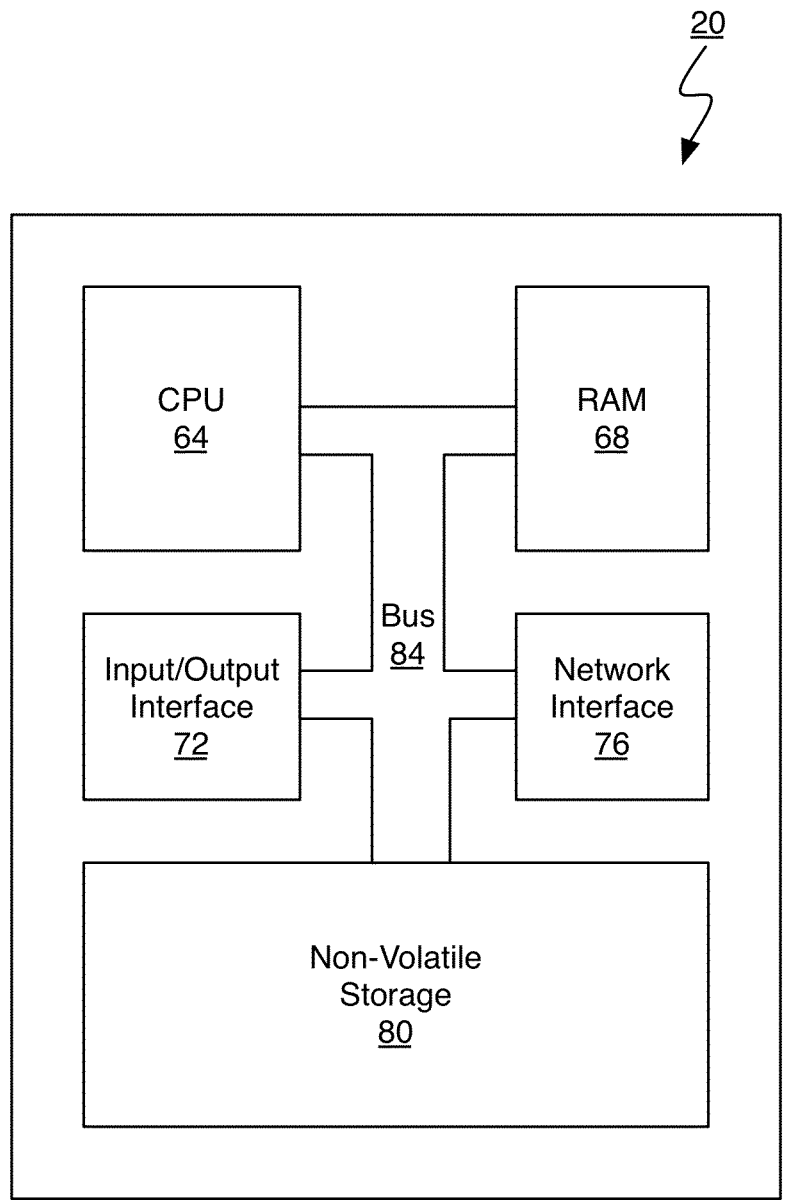
FIG. 2 shows a schematic diagram of the system of FIG. 1.

FIG. 2 shows various physical elements of the scheduling server 20. As shown, the scheduling server 20 has a number of physical and logical components, including a processor 64, random access memory ("RAM") 68, an input/output ("I/O") interface 72, a network interface 76, non-volatile storage 80, and a local bus 44 enabling the processor 64 to communicate with the other components. The processor 64 executes computer-executable instructions for providing an operating system, a scheduling software system and a number of other software systems. RAM 68 provides relatively-responsive volatile storage to the processor 64. The I/O interface 72 allows for input to be received from one or more devices, such as a keyboard, a mouse, etc., and outputs information to output devices, such as a display and/or speakers. The network interface 76 permits communication with other systems. Non-volatile storage 80 stores the computer-executable instructions for implementing the operating system and the scheduling software system, as well as the scheduling software system's data. During operation of the scheduling server 20, the operating system, the scheduling software system and the data may be retrieved from the non-volatile storage 80 and placed in RAM 68 to facilitate execution.

The scheduling server 20 has access to street network data that it uses to generate itineraries. This street network data includes a set of street segments that represent routes that can be traveled between nodes, which represent points at which a vehicle has more than one routing option. For example, a street segment can be a length of a city street that spans between two intersections, which are nodes. At the intersections, a vehicle has more than one routing option, such as, for example, traveling further along the same street, or making a right or a left turn. The following attributes are stored for street segments:
    street classification (e.g., residential road, highway, etc);
    by date range and time of day:
        travel speed;
        street closures;
        one-way information;
        turn restrictions;
        turn timing penalties; and
        vehicle type restrictions; and
    elevation grades.

The scheduling server 20 maintains a driver database in which driver characteristics are registered. These driver characteristics include the following:
driver zonal speeds: These define the average speed for a driver by geographic area. For example, a service area could consist of three areas: area A, area B, and area C. A driver could have varying familiarity with these areas affecting overall driver travel speed.
vehicle qualifications: Drivers may be qualified to operate a subset or all of the vehicles operated by the demand-response transit operator.
passenger transport qualifications: Drivers may be trained to handle different types of passengers with different needs. Some drivers may be trained in providing services to passengers with autism, muscular dysfunctions, Alzheimer's, etc. This information is maintained to pair up passengers with special needs with drivers with the appropriate passenger transport qualifications.

A vehicle database is maintained by the scheduling server 20, and includes a list of all vehicles operated by the demand-response transit operator, as well as their vehicle type and status (i.e., undergoing maintenance or available). In addition, the vehicle database stores, for each vehicle type, the capacity configurations that provide what kind of passengers the vehicle type can be configured to transport and the passenger capacity in each configuration.

The scheduling system 20 maintains a client database in which it registers various attributes of clients (i.e., passengers). When a client books a trip through a reservation agent of the demand-response transit operator, the reservation agent determines if the client is registered in the client database and, if so, confirms the information as needed. If the client is not in the client database, the reservation agent obtains various attributes from the client and registers them with the scheduling server 20 via the scheduling client computers 24. When a trip is being scheduled for a client, the attributes are taken into consideration. The attributes can include the following:
    space types
    mobility aids
    boarding and alighting times (that is, the amount of time to get on and off a vehicle)
    escort considerations
    maximum number of vehicle transfers
    passenger travel exclusions
    a list of defined passengers with which a passenger cannot travel
    a specific gender of passenger with which a passenger cannot travel
    a specific gender of driver with which a passenger cannot travel
    a specific type of passenger with which a passenger cannot travel
    specific types of vehicles on which a passenger cannot travel Reservation agents of the demand-response transit operator receive trip requests by phone and register them with the scheduling server 20 via the scheduling client computers 24. The following information is registered for or associated with a trip request. As will be understood, some of the information may be retrieved from or stored in the client database.
    point of departure, referred to as an "origin"
    destination
    requested pick-up time
    requested earliest pick-up time
    requested latest pick-up time
    requested drop-off time
    requested earliest drop-off time
    requested latest drop-off time
    duration of stay at a particular destination
    trip booking scheduling priority
    mobility aid considerations
    space type considerations
    additional passenger considerations
    maximum onboard time (the "onboard time" is the time lapsed between when a passenger boards a vehicle to when the passenger disembarks from the vehicle)

Scheduling

The scheduling server 20 employs three different types of scheduling: batch scheduling, agent-assisted batch scheduling, and single insert (real-time) scheduling. Batch scheduling is where a set of trips are scheduled all at once to the same schedule. Agent-assisted batch scheduling is similar to batch scheduling, except that some manual intervention is performed by a scheduling agent. Single insert scheduling is employed by the scheduling server 20 when reservation agents register a trip for a time period when a schedule has already been planned.

Figure 3:
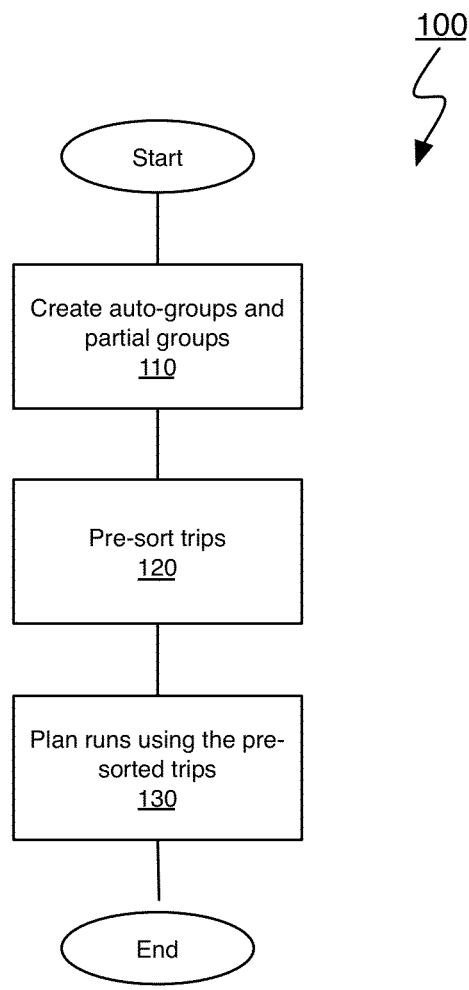
FIG. 3 shows a schematic diagram of the general method of batch generating a schedule employed by the system of FIG. 1.

The scheduling server 20 uses a number of time fields to describe when an event is to occur. An event can be, for example, a pick-up or a drop-off of a client. In many cases, these times actually represent windows of time. Those times that are window-based include early and late time values that represents the beginning and end of the window, plus a single time value that represents the focal point of a time window. Having a focal point time in each time window allows schedulers to adjust the time windows by changing a single time value. Changing the focal point time of a time window moves that window while changing the early or late time of the window resizes that window. Conceptually, these times are defined as follows:

Requested Window: The time a client originally requested for a pick-up or drop-off in a booking.
ReqTime: The booking leg requested (ideal) time and focal point time.
ReqEarly: The booking leg cannot occur before this time ("not before", optional)
ReqLate: The booking leg cannot occur after this time ("not after", optional)
ReqWin: The time window defined by the above three times
Negotiated Window: The times at which the client is told that the events will take place.
NegTime: The negotiated event (focal point) time.
NegEarly: The client agrees to be ready for pick-up or drop-off as early as this time.
NegLate: The client agrees that their pick-up or drop-off could occur as late as this time.
NegWin: The time window defined by the above three times
Scheduled Window: The times at which the transit property has scheduled the events to take place.
SchTime: The scheduled (focal point) time.
SchEarly: The event can occur as early as this time without violation
SchLate: The event can occur as late as this time without violation
SchWin: The time window defined by the above three times
Estimated Times: The times the scheduling server 20 calculated that the events will really occur at. These times are updated automatically by the scheduling server 20 in real-time.
EstTime: The time at which the scheduling server 20 estimates an event will occur.
ETA: The time at which the scheduling server 20 estimates that a vehicle will arrive at an events location (geocode.)
ETD: The time at which the scheduling server 20 estimates that a vehicle will depart an event's location (geocode.)
TravelTime: The amount of time the scheduling server 20 estimates it will take for a vehicle to travel between two events.
Distance: The amount of distance the scheduling server 20 estimates the vehicle will cover between two events.
DwellTime: The amount of time it takes to complete an event. This is usually based on load and unload times for passengers (but does not include slack time.)
Batch Scheduling FIG. 3 shows the general method of batch scheduling employed by the scheduling server 20 at 100. Prior to scheduling trips during batch scheduling, the scheduling server 20 examines the trips to be scheduled to identify common factors between the trips, such as common location, common requested time etc. Using the identified common factors, the scheduling server then groups the trips together by these common factors so that trips that would naturally fit together on the same run at more or less the same time will be grouped together. The trips are then placed in an order based on the groupings. The scheduling server 20 takes these groups and tries to place each group on as few vehicles as possible. For example, the scheduling server 20 prevents two vehicles from going to the same location at the same time for multiple pick-ups, unless absolutely necessary (such as where the capacity of a vehicle prohibits executing pick-ups for all these trips).

The single ordered trip list enables the scheduling server 20 to generate a schedule of runs for the trips in a relatively-rapid manner. If, for example, three trips (1, 2 and 3) are being batch-scheduled, then there are six possible orders in which to sort the trips:

1, 2, 3
1, 3, 2
2, 1, 3
2, 3, 1
3, 1, 2
3, 2, 1

Each order could result in a different schedule. For instance, scheduling trip 1 first may put trip 1 on a first run, A, then trip 2 on a second run, B, (assume trips 1 and 2 cannot fit on the same run). Scheduling trip 2 first might then result in trip 2 on run A and trip 1 on run B—a different schedule, possibly with different costs. Thus, batch-scheduling the trips in a different order may result in a different schedule which could be worse or better. The determination of which order of trips yields the best schedule generally involves examining all possible orders for the trips and comparing the results. When there are a large number of trips to be scheduled, such an approach becomes infeasible, as the number of calculations that would have to be performed increases exponentially with each additional trip. Also to be contemplated is that, for each trip attempted within each order attempted in the batch, multiple solutions must be considered (usually there is more than one location where the trip will fit). As a result, an exhaustive search that attempts to try all possible combinations in a batch would be infeasible even with the fastest super computer and billions of years processing time.

It has been found that, by using fast heuristic techniques to determine a single order in which the trips are placed, the "best" solution can be determined in a reasonable amount of time.

The method 100 begins with the generation of "auto-groups" and "partial groups" (110). An auto-group consists of all trips going both to and from the same geocode and have pick-up times that are within 30 minutes of one another. Geocodes are defined by matching addresses to a map, giving them a latitude and longitude that can be used to route a trip with. Auto-groups do not include trips already assigned to normal groups. As a result, the auto-groups are treated as regular groups (i.e., groups of passengers requiring travel from an origin to a destination at the same time), resulting in their scheduling in such as way as to minimize the number of vehicles used to carry each group.

Partial groups are similar to auto-groups, except that the trips grouped in a partial group have either the pick-up or drop-off geocode in common (but not both), and are within 30 minutes of each other. Partial groups do not go through the same vehicle-minimizing logic used by the scheduling server 20 for regular and auto-groups, but because they are sorted together during pre-sorting at 120, these trips have a better likelihood of being fit together during the scheduling of runs.

The set of trips to be scheduled are then pre-sorted using the auto-groups and partial groups identified at 110 (120).

The scheduling server 20 enables specification of a sort order based on various factors including the following:

Group—sorts alphabetically by group name, followed by trips that do not belong to a group.
Time Period—sorts trips in groups lumped together by time period (earliest to latest in the day).
Travel—sorts by trip length, from longest to shortest. It can be better to schedule longer trips first as longer trips have a more significant impact on establishing the final look, or pattern, of the run. It is also easier to fit shorter trips on later in the process than it is longer trips.
Travel Period—sorts by trip length, lumped together by travel period, from longest to shortest.
Priority—from highest priority to lowest priority. Higher numbers indicate a higher priority. For example, a 10 comes before a 9.
Peak Period—sorts by the period in which the trip falls, starting from the AM and PM peak periods and then working progressively away from the peak periods until you get to the beginning of the day, the end of the day, or noon. It is sorted by distance from peak period. AM trips (those before 12 pm) are compared to the AM peak time while PM trips (those >=12 pm) are compared to the PM peak time. Each trip's period is a measure of the number of periods away from the peak period.

Example

Assume the period size is 60 minutes and the AM peak period is 8:00 to 9:00 and PM peak period is 5:00 pm to 6:00 pm. The periods are thusly numbered for sorting purposes:

|  | AM | | | | | | | PM | | | | | | | |
| --- | --- | --- | --- | --- | --- | --- | --- | --- | --- | --- | --- | --- | --- | --- | --- |
| Period start time | 5 | 6 | 7 | 8 | 9 | 10 | 11 | 12 | 1 | 2 | 3 | 4 | 5 | 6 | 7 | 8 |
| Distance from peak | 3 | 2 | 1 | 0 | 1 | 2 | 3 | 5 | 4 | 3 | 2 | 1 | 0 | 1 | 2 | 3 |

In this example, all periods with a distance number of 0 get lumped together. That actually means the 8 am to 9 am period trips are lumped together with the 5 pm to 6 pm period trips. Then the trips periods with a distance from the peak of 1 come next, and so on. This means that up to four periods at a time can be lumped together and then sub-sorted by some other factor, such as trip distance. In practice, this approach works as trips from different periods do not normally interfere with each other since they are not typically adjacent in terms of real time.

The specific options for sorting the trips are as follows:
0—Time Period/Group/Priority/Travel—,
1—Priority/Group/Travel Period/Time Period/Travel
2—BookingId
3—Time Period/Priority/Group/Travel
4—Priority/Group/Travel Period/Peak Time/Travel
5—Peak Period/Priority/Group/Travel Switches Used for Peak Period Sorts PeakPeriod really refers to the time distance from the AM or PM peak time counted in period units determined by SortPeakPeriodSize while the AM and PM peak time itself is determined by the SortPeakPeriodHistogramSize. The "SortPeakPeriodSize" and "SortPeakPeriodHistogramSize" descriptions should probably be different, although the two switches are related.

SortPeakPeriodHistogramSize: Size of the periods in minutes used to calculate a trip count histogram by time of day. This is used to build a histogram of the number of bookings per time period where the time period size is equal to the switch value in minutes. From this histogram, the peak period for the AM and the peak period for the PM is determined. The estimated departure time is used for the booking which is pick-up ReqTime or drop-off ReqTime–average travel time. If the booking already has a SchTime then that takes over from ReqTime in determining the departure time, but if no SchTime exists yet (as for brand new bookings) then ReqTime is used.

SortPeakPeriodSize: Once the AM and PM peak times are known, the time difference of trips from those peak times are computed. Once again, the estimated departure time is used for the booking, which is pick-up ReqTime or drop-off ReqTime–average travel time. These "times away from the peak" are then used to lump trips together based on time intervals whose size is determined by the SortPeakPeriodSize. The default setting is 30 minutes which means that bookings whose estimated departure time falls between 0 to 30 minutes from the peak get lumped together and those with 30 to 60 minutes get lumped together and so on. The effect is to sort the trips so that the peak period trips are scheduled first, and then the remaining trips are scheduled moving progressively away from the peak periods in time intervals whose size is determined by the SortPeakPeriodSize. All trips within the same period are treated equally by this sort and are further sorted by lower level sorting criteria. The only reason that both SortPeakPeriodHistogramSize and SortPeakPeriodSize is used is in case it is desirable to use different sized periods after the peak times are computed from the size of the periods used to compute the peak times in the first place. By default however these two period sizes are the same though there is no reason why they have to be.

Switches Used for Time Period Sorts

In the sort order formulas, TimePeriod means absolute time of day period counted in units determined by SortTimePeriodSize.

SortTimePeriodSize: Size of the time period used by the batch sort in minutes. For example, if this is set to 60, the day is divided into 24 one hour time periods.

SortTimePeriodOffset: Offset of the time period used by the batch sort (added to the hour in minutes). For example, if this is set to 30 and the SortTimePeriodSize is set to 60, the trips are aggregated into one hour intervals based upon the half hour, which would produce time intervals from 0:00 to 0:30, 0:30 to 1:30, 1:30 to 2:30 and so on.

Switches Used for Travel Period Sorts

SortTravelPeriodSize: Size of the travel time period (in minutes) used by some of the batch pre-sort orders. For example, setting this to 5 would lump together trips whose travel time (origin to destination) was 0-5 minutes, 5-10 minutes, and so on.

After the pre-sorting of trips is completed at 120, the scheduling server 20 schedules each trip in the set one at a time in the order determined by the pre-sort (130).

The trips are selected one at a time and runs are generated. For example, the first two trips in the pre-sorted list of trips for the day may, depending on how the list was sorted, belong to the same group, auto-group or partial group. In this case, it is likely that the second trip will be scheduled on the same run as the first. As the scheduling server 20 schedules trips, new runs are generated where insertion of the trips results in violations or inefficiencies as measured using a scoring system for runs of a schedule and, collectively, a schedule.

Schedules and runs are evaluated by calculating a weighted function of characteristics of the runs. Various inputs, including the weightings, can be configured by the demand-response transit operator.

Cost Weightings

All costing weights are integers with a value between 0 and 25. A value of 0 turns off the weight. 1 is the minimum weight that has affect. 25 gives the weight the maximum effect. The costing weights and characteristics include the following:

| Weight name | Display name | Comments |
|---|---|---|
| CWD | Minimize Distance | |
| CWT | Minimize Time | |
| CWOOW | Minimize Out Of Way | |
| CWTOOW | Minimize Trip Out Of Way | |
| CWOBT | Minimize passenger On-Board Time | |
| CWGEO | Maximize Same Geocode | Apply negative cost bonus when even is inserted next to another event with same geocode. |
| CWBT | Minimize backtracking | Backtracking describes the situation where a passenger revisits a general location previously visited during a trip. It is undesirable for both the client and the transit operator. |
| CWPO | Minimize vehicle pull-outs | |
| CWRD | Minimize Requested Time Deviation | Minimize the degree to which a bookings scheduled time differes from its requested time. Applies only when p_ESW or p_LSW are greater than zero. |
| CWWK | Minimize walking distance | |
| CWTR | Minimize number of transfers | |
| CWV | Minimize violations | |
| CWDH | Minimize deadhead | |
| CWPC | Minimize provider $ cost | |
| CWTAXG | Minimize taxi garage distance | |
| CWPOS | Minimize garage pull out slack time | |
| CWPIS | Minimize garage pull in slack time | |
| CWRTF | Maximize run time flexibility | |
| CWLB | Maximize load balancing between runs | Works to evenly divide work load among vehicles. Work is defined as pullout to pullin time minus empty slack time. |

Costing Variables

Costing variables are additional parameters that apply to certain costing weights. All are passed as integer values. Some approximate floating point numbers by multiplying the floating point value by 100 then casting to an integer to simulate a precision of 2 digits to the right of the decimal point.

| Variable name | Display name | Values | Comments |
|---|---|---|---|
| CVFOBT | Free on-board-time factor | Percent | Actual on-board time must exceed the direct travel on-board time by this factor before on-board time cost applies. Factor expressed as a percentage. Example: 1.5 would be passed as integer 150 |
| CVSTM | Seconds to meters conversion ratio | Centimeters | Indicates equivalency between distance and time for cost comparison purposes: To say that 1 second equals 2.68 meters, you would pass integer 268 |
| CVDTM | Dollars to meters conversion. | Meters | Used to equate $ cost of provider to distance cost which is used by other weights. Example: to say $1 in provider charge is equivalent to 1000 meters driving you would pass integer 1000 |
| CVFPO | Free pullout factor | Percent | Percentage (0 to 100) of runs that can pull out without a pullout cost being applied to them. |
| CVOOWE | Out Of Way Extra | Meters | Meters as integer. Expands the size of the imaginary box around a pair of events such that if a new event is inserted between those two events, if the new event is outside the box the OOW/TOOW costs apply and if the new event is inside the box the OOW/TOOW costs do not apply. |
| CVDHTHT | Deadhead threshold time | Minutes | Applies to the formula of the CWDH weight. |
| CVLBT | Load balance threshold | Percent | Percentage (0 to 100) calculated as work time (see CWLB) divided into maximum run time. Can be thought of as % run utilization from drivers point of view. The Load Balance weight will not kick in until a run is over this threshold. |

Violation Parameters

Violation parameters are used to indicate which violations are permitted in the search results. For violations that have no degree, a value of 0 indicates not allowed and a value of 1 indicates allowed. For violations with degree the integer value indicates the allowed degree.

| Variable Name | Values | Description |
|---|---|---|
| SL | minutes | max(0, EstTime-SchLate). Standard event late violation |
| SE | minutes | max(0, SchEarly-EstTime). Standard event early violation. This violation type does not normally occur. |
| RL | minutes | max(0, EstTime-ReqLate). Request late time violation. Also known as appointment time, or "not after" violation |
| RE | minutes | max(0, ReqEarly-EstTime). Request early time violation. Also known as "not before" violation. |
| FX | minutes | max(0, EstTime-SchLate) or max(0, SchEary-EstTime) for flex events (fixed stops). When a fixed/flex bus misses it's scheduled stop time at a fixed bus stop. |
| OB | minutes | Number of minutes that client exceeds his/her maximum on-board time. |
| ES | boolean | Occurs when child events are out of order. For example, if a client drop-off is positioned before the corresponding pick-up. |
| COV | boolean | Occurs when two or more trips of the same client overlap. For example, if return trip overlaps outgoing trip. |
| HO | minutes | Hostage violation (client is onboard for too long during a layover.) |
| BT | boolean | Occurs when a client is returned to a coordinate that he/she has already visited within the same trip. |
| MG | boolean | Occurs when two or more exclusive groups are on the bus at the same time. |
| CAP | boolean | Occurs when the run seating capacity is exceeded. |
| RnP | boolean | Occurs when a run stops in an invalid polygon. |
| RnL | minutes | max(0, EstTime-SchLate) for pullin event. This is a late pullin violation |
| RnE | minutes | max(0, SchEarly-EstTime) for pullout event. This is an early pullout violation |
| RLE | minutes | Number of minutes that pullin EstTime-pullout EstTime exceeds the maximum run length for this run. |
| WK | Meters | Walking distance violation |
| TT | minutes | Transfer time violation (missed transfer) |
| TL | minutes | Transfer layover time violation |
| BrO | boolean | Passenger on-board during break event violation |
| PR | boolean | Invalid provider violation |
| CD | boolean | Passenger requires a vehicle with co-driver but vehicle does not have a co-driver. |
| LIFO | boolean | Vehicle requires Last In First Out ordering of picks and drops and the sequence is invalid |
| MA | boolean | Mobility aid violation (passenger event is missing required mobility aid.) |
| Ser | boolean | Vehicle does not provide the para service type that passenger requires. |
| RAR | boolean | Event geocode or time does not fit into the run's service area route sequence. |
| SAR | boolean | Event does not meet one of the run's service area rules. |

Solution Parameters

Solution parameters define different general aspects of how the scheduling server 20 performs the scheduling.

| Variable Name | Display Name | Units | Comments |
|---|---|---|---|
| SDepth | Solution Depth | Int32 | The number of solutions for a trip that the algorithm should search for and cost before choosing one. |
| AST | Additional Search Time | milliseconds | The maximum amount of time the algorithm should spend looking for additional solutions for a trip after it has already found at least one. |
| STO | Search Timeout | milliseconds | The maximum amount of time the algorithm is allowed to search for solutions for a single trip. |
| ESW | Early Search Window | seconds | The number of seconds before the requested time that the algorithm can schedule an event. |
| LSW | Late Search Window | seconds | The number of seconds after the requested time that the algorithm can schedule an event. |
| FC | Fast Cost | Boolean | Turns fast costing on or off for the search (off by default) |
| FCD | Fast Cost Depth | Int32 | Number of fast-costed solutions that will be re-costed and compared using regular costing. Higher values yield better results but slower scheduling, smaller values yield faster scheduling. |
| FLV | Filter by Vehicle (or run) | Boolean | If TRUE and more than one solution for the same run/vehicle is found then only the top choice for that vehicle will be included in the final result set and the other solutions for that vehicle are |

-continued

| Variable Name | Display Name | Units | Comments |
|---|---|---|---|
| | | | filtered out of the final result set. Ignored in the batch because it always chooses the top solution among all vehicles anyhow. |
| TONS | Taxi On No Solution | Boolean | If TRUE then a taxi solution will be suggested if no other solutions are found and taxi's were not included in the original search (if the "T" parameter was not specified.) |
| MaxCost | Max Cost | Int32 | If p_UsemaxCost is non-zero then solutions that have a cost > this value are filtered out of the final solution set (not returned.) |
| UseMaxCost | Use Max Cost | Boolean | If non-zero then p_MaxCost applies, otherwise p_MaxCost is ignored. |
| BumpRule | Bump Rule | Enum | See typedef enum SolutionBumpRule in PassCommonDefs.h |
| BatchSort | Batch Sort Order | Enum | Hard coded list:<br>0 = TimePeriod/Group/Priority/Travel<br>1 = Priority/Group/TravelPeriod/TimePeriod/Travel<br>2 = BookingId<br>3 = TimePeriod/Priority/Group/Travel<br>4 = Priority/Group/TravelPeriod/PeakPeriod/Travel<br>5 = PeakPeriod/Priority/Group/Travel |

A transit operator can save sets of values for the above cost weightings, cost variables, violation set parameters and solution parameters as "scheduling strategies" and apply them for different scenarios. One scheduling strategy can be designated as a default scheduling strategy, and other scheduling strategies may be designed for certain circumstances. For example, the following scheduling strategies may be set out:
  default: employs a specific set of values for a typical booking request
  emergency: employs more relaxed violation parameters to force a trip to be scheduled
  holiday: employs a varying set of values for the varying conditions on holidays In order to better illustrate the concept of scheduling strategies, an exemplary scenario will now be described. A reservation agent requests a trip to be scheduled employing the "default" strategy and the scheduling server 20 returns "no solution". The reservation agent negotiates with the client but cannot find a suitable solution or time. The agent then invokes the "emergency" strategy with looser violation parameters and a solution is identified. The violation on this solution may be identified as a "back track exceeds 2 miles"; this is an acceptable violation to ensure the ADA client is provided a trip. The trip is saved and booked.

In addition, as the day progresses, the scheduling server 20 has been configured to flag this trip as a "bad solution" and the batch agent is running. The 'batch agent' continually fine-tunes the schedule during the day to improve already scheduled work. The agent will identify a more suitable run for this trip and will update the schedules accordingly. When rescheduling, the system will respect the agencies pre-defined pick-up and drop-off windows.

The scheduling server 20 also scans through the daily schedules and identify poorly scheduled/inefficient trips. If enabled, the scheduling server 20 periodically analyzes the entire schedule for a day by re-costing each scheduled trip. If the trip cost exceeds a user defined threshold, the trip will be deemed as inefficient and will be "bumped".

Trip bumping is to movement ("bumping") of trips from a vehicle itinerary to a "bump list" (taxi-type run) in order to accommodate other trips and in so doing make the overall scheduling solution more cost effective.

Single Insert Scheduling (i.e. Real-Time)

Single insert scheduling is employed by the reservation agents at the time that a trip request is received for a schedule that has been previously planned. Single insert scheduling is based on a heuristically-modified process of exhaustive searching. For each potential solution, the scheduling server 20 determines a "cost" based on the same formulas used to generate a batch schedule as noted above. Costing includes determining estimated times, travel times, violation checking and weight costing. Heuristics are employed to reduce the number of solutions or solution paths to be investigated. Instead of exhaustively attempting to insert a trip into every possible position on every run, the scheduling server 20 abandons attempted solutions before or part-way through the costing attempt. For each solution it skips, it can avoid performing the recalculation of estimated times, travel times, violation checking and weight costing that it would have to do if it attempted the solution. For example, if a solution it is currently attempting fails the violation checking phase of the insertion attempt, it can skip the weight costing phase and move directly on to a new solution, therefore saving valuable processing time. Runs can be excluded based on geography, time, service type, vehicle type, etc. Additionally, the end-user can specifically select runs to search for solutions on. This combined heuristic pruning of the search tree in a single insert operation results in finding the top solutions in about 1/100th the time it would take if full exhaustive searching without heuristics was used.

By using heuristics to identify scheduling solutions that are likely "optimal", optimal solutions are located the majority of the time. While, in few cases (generally less than one percent), the solution found may not be optimal, it has been found that the calculation speed benefits from using this heuristic approach far outweighs the disadvantage of the occasional missed optimal solution.

Additional Considerations

The scheduling server 20 employs turn restrictions and turn penalties when scheduling trips. Turn restrictions are when certain turns at intersections (such as left turns etc.) cannot be made at certain times of the day, days of week or on particular dates.

In addition, the scheduling server 20 uses driver zonal speeds. The purpose of driver zonal speeds in street routing is to be able to account for a driver's familiarity with different areas of a city. If a driver is in an area they are not familiar with then the speed assumed by the routing algorithm should be reduced. This will allow for more travel time when a driver is in an unfamiliar area.

Run-Time Scheduling Adjustments

During the course of operation, the scheduling server 20 reviews the schedule during its performance to see if it is deemed to need adjusted. The following are examples of why a schedule can benefit from adjustment:

input may be received from a driver via the OBU 40 indicating that a client is a "no-show";
  input may be received from a driver via the OBU 40 indicating the driver has completed a pick-up and is about to depart for the next stop;
  AVL data indicating the location of a vehicle at a point in time that differs from its scheduled location (e.g., a vehicle is behind schedule);
  the single insertion of a newly-requested trip that may cause the schedule to become less than optimal;
  several clients may have cancelled trips on the same day that they are scheduled, potentially opening up free time on a driver's schedule that was previously fully scheduled; and
  manual manipulation of the schedule by schedulers/dispatchers may have led to a decrease in efficiency of the schedule.

The scheduling server 20 automatically updates each run's estimated times (such as EstTime, ETA, ETD, etc.) using the latest information available as provided by the AVL data, the input received from the drivers, etc. The batch agent of the scheduling server 20 then evaluates the "fit" of the schedule based on this information. The fit of the schedule is determined by calculating a weighted function of the characteristics of the runs, as previously discussed. In this manner, the scheduling server 20 identifies poorly scheduled/inefficient trips.

All of the automated scheduling is initiated via a schedule agent. The schedule agent starts and stops automated tasks, referred to as jobs, by managing the services that actually carry out the tasks, referred to as job agent. Each job can have parameters associated with it that the schedule agent passes to the specific job agent when the job starts. These parameters take the form of an eXtensible Markup Language ("XML") document. The schedule agent uses its own service timer thread to perform its automated tasks.

The scheduling agent maintains a schedule of jobs in memory that it initially reads from a database table. The schedule includes parameters for running each job. The parameters indicate when each job is to be run, and other aspects of the job. The schedule agent starts jobs according to this schedule and stops jobs if needed before the job agent service has completed the job.

The schedule includes the following parameters:

JobID: the ID of the particular job

JobAgentName: the name of the job agent to be launched when the job is run

Priority: the priority of the job, used to determine which job takes precedence when there is a scheduling overlap EnableFlag: flag used to enable or disable a particular job in the schedule without having to delete and re-enter the job FromDate: the job will only be run on or after this date; a value of zero indicates that there is no such limitation ToDate: the job will only be run on or after this date; a value of zero indicates that there is no such limitation StartTime: the job will only be run on or after this time of day; a value of −1 or null indicates that the job is not to be started automatically, but it may be started by another job EndTime: the job will only be run before this time of day; a value of −1 or null WeekTemplate: the job will only be run on the specified weekdays Interval: the time, in seconds, between repetitions of the job starting at the start time and ending at the end time; for example, if the start time is 0900, the end time is 1800 and the interval is 3600, then the job will be run at 0900, 1000, . . . , 1700, but not at 1800; if the interval is zero or null, then the job is run only at the start time; if the job has not completed by the next interval, then that interval is skipped MaxLength: if this value is greater than zero, then the job is only permitted to run for this amount of time, in seconds, once started; if this value is zero or null, then there is no independent limit on the duration of the job RepeatCount: the number of times the job will be repeated at each interval; if zero or null, the job only runs once per interval; if a series of repeating jobs does not complete by the next interval, then it may cause the next interval run to be skipped RepeatDelay: if this value is greater than zero, then the job will pause for this number of seconds between each repeat run NextJobID: the job ID of another job that is to be started as soon as this job completes; the other job will not be started if this job was stopped due to the max length limit Comments: description of the job JobData: an XML parameter string that is passed to the job's agent service when it is started; the format of the contents is specific to each unique job agent The JobAgentName identifies the agent type of the job. For example, one agent called "PassScheduleAgent" would be responsible for calling the schedule server to run batch/match processes. Other types of agents can be created in the future for performing other background tasks. For example, a "ScheduleValidator" agent may be created that runs periodically to check the validity of the schedule data and that reports any problems found to a log or that even auto-repairs data.

The JobAgentNames is a hard-coded list and extended only as new agents are developed. Currently the JobAgentName must be the same as the service name of the service that hosts the agent. So for example the "PassScheduleAgent" agent is hosted by the "PassScheduleAgent" service and the "ScheduleValidator" agent is hosted by the "ScheduleValidator" service and so on.

Interval is used to schedule a job to run at regularly timed intervals starting at the start time. StartTime and Interval are typically set such that the intervals fall on the hour or half hour etc.

RepeatCount is optional. It allows a job to be repeated x number of times within each interval. This might be used for instance to re-run a batch "reschedule the scheduled" 3 times back to back per interval in order to optimize a schedule periodically. RepeatDelay can be set in order to add a delay between each repeat if desired.

NextJobID allows jobs to be chained together. For instance, it may be desired to run a particular job only after another job finishes. Jobs can be created that run only as chained next jobs by setting their StartTime to −1 or null and then assigning their JobId to the NextJobId field of the job that is to call it.

JobData holds parameters specific to each job and JobAgentName. In the case of the PassScheduleAgent, it holds the information that determines which schedule and which trips will get batched and with what batch options. This data is stored as an XML string for flexibility and convenience. This allows each job agent type to define its own intricate parameter data without having to extend the schema definition of the database table itself, making the table more generic.

All JobData XML Strings have the same root element of <agentJobData> regardless of the AgentName. <agentJobData> has two child elements: The <header> element may or may not exist and can be used to contain generic job information that is not specific to the type of the agent. It may be used by the generic job scheduler in the future. The other child of <agentJobData> is <body>. Inside this element is a custom XML sub-document that provides the parameters specific to the job for that particular agent.

Example

```
<agentJobData>
    <header>
        ...
    </header>
    <body>
        ...
    </body>
</agentJobData>
```

The PassScheduleAgent service has an AgentName of "PassScheduleAgent" (same as its service name). The purpose of PassScheduleAgent is to launch and control various types of batch jobs on the PASS Schedule Server. Currently it supports two types of batch jobs: BatchSchedule and BadTripLocator. Each type of job has its own root element under the agentJobData <body> element. The BatchSchedule job is described in the <batchSchedule> element and the BadTripLocator by the <badTripLocator> element. The PassScheduleAgent expects to find one or the other of these elements, but not both, as the only child of the <body> element.

The BatchSchedule job is described by the <batchSchedule> element. Inside <batchSchedule> is a <schedule> element and a <batches> element which itself an array of <batch> elements.

Example

```
<body>
    <batchSchedule>
        <schedule>
        </schedule>
        <batches>
            <batch>
            </batch>
            <batch>
            </batch>
            ...
        </batches>
    </batchSchedule>
</body>
```

The <schedule> element is used to describe which schedule is to be acted on. It has the following children:

| Name | Type | Default | Description |
| --- | --- | --- | --- |
| schId | int | 0 | If > 0 then this specifies an exact schedule to act on and the following 2 elements are ignored. |
| schTypeId | int | 0 | If schId is zero this determines the schedule type in which dayOffset will be applied in order to determine the correct schId. |
| dayOffset | int | 0 | If schId is zero this determines which schedule is being batched by adding this value to the current date. A value of zero means today, 1 means tomorrow, 2 the day after tomorrow and so on. |

Each <batch> element describes a single batch run within the selected schedule. The batch runs are performed in the order in which they appear in their <batches> parent element. This allows a single batch schedule job to consist of a sequence of individual batches each with its own batch parameters. For example, a job may consist of a batch the unscheduled followed by a batch of reschedule the already scheduled followed by another batch the unscheduled (a typical sequence often performed manually right now.)

The <batch> element contains the following children: <parameters>, <tripSelection> and <runSelection>.

Example

```
<batch>
    <parameters/>
    <tripSelection/>
    <runSelection/>
</batch>
```

The <parameters> element is used to specify parameter and violation sets. It has the following children:

| Name | Type | Default | Description |
| --- | --- | --- | --- |
| schedUnsched | bool | true | If non-zero then schedule the unscheduled, if zero then do not schedule the unscheduled bookings. |
| resched | bool | false | If non-zero then allow to reschedule the bookings that are already scheduled (re-optimize them) |
| unschedAllFirst | bool | false | If non-zero then unscheduled all bookings in the schedule first at the start of the batch or match. Only bookings that caller has provider security for will be unscheduled. |
| unschedAllSelectedFirst | bool | false | If non-zero then unscheduled all the bookings in the list of provided bookings at the start of the batch. Only bookings that caller has provider security for will be unscheduled. |
| resetSchTime | bool | false | If non-zero then SchTime's for the selected bookings will get reset back to their NegTime's should they be different. If NegTimes are null then SchTimes are not changed regardless of this setting. |
| noReqTime | bool | false | If true then bookings without requested times will be scheduled. If false then bookings without requested times will be ignored by the batch. |
| reschedTaxi | bool | false | If non-zero then bookings already on taxi's can be rescheduled or unscheduled if the resched or unschedulAllSelectedFirst option is true. If zero then bookings on taxi runs are not rescheduled or unscheduled even if resched or unschedulAllSelectedFirst is set to true. |
| allowReschedTransfers | bool | false | If zero then bookings that are currently scheduled with transfers will not be rescheduled even if the resched option is set to true. Transfer bookings can still be unscheduled by the unschedulAllSelectedFirst or unschedAllFirst options regardless of this setting. |
| changeSchTime | bool | false | If non-zero then SchTime's are allowed to move by the early/late search tolerances specified in schParameters. |
| transitModes | String | PLF | The transit modes (types of runs) that the trips are allowed to be scheduled to. Each mode is designated by a single letter. The order of the letters is not important. If not provided then it assumes all modes except for taxis.<br>P = Para<br>L = Flex<br>F = Fixed<br>T = Taxi |
| EP-R | bool | true | If true in combination with "L" transitModes flag then flex is allowed to deviate to booking origin/dest. Can be combined with EP-CS |
| EP-CS | bool | true | If true in combination with "L" transitModes flag then flex is allowed to require passenger to walk to closest stop on flex route. Can be combined with EP-R |
| groupOptimizer | bool | true | If true then enables the group booking optimizer in the batch. |
| itineraryOptimizer | bool | false | If true then enables the itinerary search algorithm for multi-booking itineraries. |
| parameterSet | String | "DefBatch" | The name of the parameter set to use. The default is to use the default batch parameter set specified in the system properties. |
| violationSet | String | "DefBatch" | The name of the violation set to use. The default is to use the default batch violation set specified in the system properties. |

-continued

| Name | Type | Default | Description |
|---|---|---|---|
| matchSchId | int | 0 | If non-zero then match the schedule being batched to this schedule. If this parameter is zero, then all subsequent match parameters will be ignored. |
| schedFailedMatch | bool | false | If true, the batch algorithm will proceed to schedule bookings that failed to match in the schedule with matchSchId. |
| matchSynchTimes | bool | false | |
| matchSynchGeo | bool | false | |
| matchSynchEstTime | bool | false | |
| matchSynchFrozenEvents | bool | false | |
| copyClusters | bool | false | If true, the batch matching algorithm will include clusters in the match, and will copies of them in the target schedule if they existed in the matching schedule. |

The <tripSelection> is used to dynamically form a list of which bookings will be scheduled/rescheduled in the batch. It has the following children (the order does not matter).

| Name | Type | Default | Description |
|---|---|---|---|
| fromTime | SFM | −1 | If >−1 then only bookings with a SchTime or ReqTime >= this time will be included. SchTime, if set, overrides ReqTime in the comparison. |
| toTime | SFM | −1 | If >−1 then only bookings with a SchTime or ReqTime <= this time will be included. SchTime, if set, overrides ReqTime in the comparison. |
| timeWindowLength | seconds | 0 | If >0 then combines with timeWindowOffset to form a dynamic booking from/to time window based on the time the batch job starts. The from-time will be calculated as currentTime + timeWindowOffset. The to-time will be calculated as currentTime + timeWindowOffset + timeWindowLength. If the resulting to-time exceeds 24:00 then it is treated as x-time within the same date, not the next date. |
| timeWindowOffset | seconds | 0 | See timeWindowLength. Does not apply if timeWindowLength is zero or NULL. |
| spaceTypes | String | | Comma separated list of space types. Only include bookings that have one of the specified space types in their booking activity. |
| bookingSubtypes | String | | Comma separated list of booking subtypes (bookingSubTypeAbbr). If empty, all booking subtypes are allowed. If non empty, only those bookings with one of the specified subtypes will be included. |
| paraServiceTypes | String | | Comma separated list of allowed ParaServiceId's. If empty then bookings with any ParaService type is included. |
| providerIds | String | | Comma separated list of allowed ProviderId's. If empty then any provider's bookings are allowed. This is used to select bookings based on the providerId assigned to each booking. Example: ProviderId's 1, 5 and 7 would be listed as: "1, 5, 7" |
| violations | String | | Comma separated list of violation types and their degree. If provided, then only bookings that have that type of violation current stamped on them with the degree >= this degree will be schedule/rescheduled. Example: "SL10, RL5, RnP". This example says to only include bookings with a schedule late violation >=10 minutes or a requested late violation >=5 minutes or a run polygon violation. The degree is a number that immediately follows the violation abbreviation. Not all violations have degrees. |

-continued

| Name | Type | Default | Description |
|---|---|---|---|
| sendStatus | String | | If no degree is specified then it assumes any degree qualifies. Comma separated list of sendStatus's. Only bookings with one of these sendStatus values will be included. |
| schedStatus | String | | Comma separated list of schedStatus's. Only bookings with one of these schedStatus's will be included. |

The <runSelection> element is used to specify which subset of runs trips should be allowed to be scheduled to in the batch. It has the following children:

| Name | Type | Default | Description |
|---|---|---|---|
| runNames | XML | | A child XML document that contains an array of run names (matched against EvStrName in EventStrings table.). If empty then all runs are assumed to be included in the run subset. Example:<br><runNames><br><name>101a</name><br><name>101b</name><br><name>102</name><br></runNames> |
| providerIds | String | | A comma separated list of provider ids. Only runs with one of these provider ids will be included in the run subset. Example: "1, 5, 7" |
| emptyRule | int | 0 | 0 = any run<br>1 = only include empty runs<br>2 = only include non-empty runs |
| violations | String | | Comma separated list of violation types and their degree. If provided, then only runs that have that type of violation current stamped on them with the degree >= this degree will be schedule/rescheduled. |

The PassScheduleAgent calls the scheduling server 20 using the login name of the job (passed to the PassScheduleAgent by the CoreAgent service through the PROP_USERNAME context property when the job was started). The scheduling server 20 uses this login name to enforce provider security during the batch.

The BadTripLocator job is described by the <badTripLocator> element. It is similar to the <batchSchedule> element in that it has as its first child the same <schedule> element used to select which schedule the job will operate on. Its second child element is the <parameters> element which contains the remaining parameters for the bad trip locator job. Unlike the BatchSchedule job, the BadTripLocator can not contain multiple batch jobs inside it. The BadTripLocator job describes just a single batch operation.

The structure of the BadTripLocator element is as follows:

```
<body>
    <badTripLocator>
        <schedule>
            . . .
        </schedule>
        <parameters>
            . . .
        </parameters>
    </badTripLocator>
</body>
```

The contents of the <schedule> parameter is the same as those in the BatchSchedule job and are described in the previous section above.

The contents of the BadTripLocator <parameters> element are described in the following table:

| Name | Type | Default | Description |
|---|---|---|---|
| bumpIntervals | struct | n/a | A sub-structure containing bump cost range intervals sorted in the order in which they should be processed. The BTL will first look to bump and/or reschedule trips that are over the first cost range. Then, once it has finished those trips, it will do the same to the next cost range and so on until there are no more cost ranges to process. The XML structure of this parameter is as follows:<br><bumpIntervals><br><interval><br></interval><br><interval><br></interval><br>. . .<br></bumpIntervals> |
| bumpIntervals/interval | struct | n/a | The <interval> child array element inside the <bumpIntervals> element. It has the following structure: |

-continued

| Name | Type | Default | Description |
|---|---|---|---|
| | | | <interval><br>  <cost>integer</cost><br>  <resched>bool</resched><br></interval> |
| bumpIntervals/interval/bumpCost | int | n/a | The solution cost of a trip in its current position (what the cost would be to insert it into its current position as if it were not already there.) This is the same as the "weight" value displayed in the schedule wizard.<br>Only trips with a current cost greater than this value will be bumped. |
| bumpIntervals/interval/reschedCost | int | n/a | The solution cost of a trip in its current position (what the cost would be to insert it into its current position as if it were not already there.) This is the same as the "weight" value displayed in the schedule wizard.<br>Only trips with a current cost greater than this value and less than or equal to the bumpCost will be rescheduled. |
| bumpIntervals/interval/resched | bool | false | Indicates whether the BTL should try to reschedule a trip that is above the interval's bumpCost before bumping it. If a reschedule is successful at below the interval's bumpCost then the trip will be rescheduled, otherwise it will be bumped.<br>Set to 1 (true) to enable the reschedule option. Set to 0 (false) to disable it.<br>When disabled, trips that are above the bumpCost will only be bumped. Does not affect the reschedCost value. Trips whose cost is above the reschedCost but below the bumpCost will attempt to be rescheduled regardless of the value of resched. |

Complete examples of a XML strings stored in the JobData field of the PassAgentJobs table for the PassScheduleAgent jobs are shown below.

Example 1

JobData field value for a BatchSchedule job entry in which tomorrow's schedule is rescheduled from scratch, followed by rescheduling the already schedule (to re-optimize) followed by attempting to schedule any left over unscheduled trips after the re-optimize. Selected options include resetting SchTimes on first batch run, use of Para and Flex transit modes on all batch runs and use of allowed violations in final batch run. In all cases, all trips and runs are assumed to be allowed so <runSelection> and <tripSelection> elements do not need to be included since trip and run selection always default to all in the absence of any other limiting factors. Note that the provider security still automatically limits trip and run selection even when these elements are not provided.

```
<agentJobData>
    <header>
    </header>
    <body>
```

```
        <batchSchedule>
            <schedule>
                <schId>0</schId>
                <schTypeId>2</schTypeId>
                <dayOffset>1</dayOffset>
            </schedule>
            <batches>
    <batch>
        <parameters>
            <unschedAllFirst>1</unschedAllFirst>
            <resetSchTime>1</resetSchTime>
            <transitModes>PL</transitModes>
            <parameterSet>NewBatch</parameterSet>
            <violationSet>None</violationSet>
        </parameters>
    </batch>
    <batch>
        <parameters>
            <resched>1</resched>
            <transitModes>PL</transitModes>
            <parameterSet>OptimizeBatch</varameterSet>
            <violationSet>None</violationSet>
        </parameters>
    </batch>
    <batch>
        <parameters>
            <transitModes>PL</transitModes>
            <parameterSet>OptimizeBatch</parameterSet>
```

```
            <violationSet>Minimal</violationSet>
        </parameters>
    </batch>
</batches>
        </batchSchedule >
    </body>
</agentJobData>
```

Example 2

JobData for a BatchSchedule job that first schedules unscheduled wheelchair trips (including scooter type SC) for todays date that have subtype "DIA" (dialysis) then followed by any unscheduled trips. The "Level1" violation set is used for the wheelchair batch but not for the any space type batch that follows it.

```
<agentJobData>
    <body>
        <batchSchedule>
            <schedule>
                <schId>0</schId>
                <schTypeId>2</schTypeId>
                <dayOffset>0</dayOffset>
            </schedule>
            <batches>
<batch>
    <parameters>
        <schedUnsched>1</schedUnsched>
        <transitModes>P</transitModes>
        <parameterSet>Default</parameterSet>
        <violationSet>Level1</violationSet>
    </parameters>
    <tripSelection>
        <spaceTypes>WH,SC</spaceTypes>
        <bookingSubtypes>DI</bookingSubtypes>
    </tripSelection>
</batch>
<batch>
    <parameters>
        <schedUnsched>1</schedUnsched>
        <transitModes>P</transitModes>
        <parameterSet>Default</varameterSet>
        <violationSet>None</violationSet>
    </parameters>
</batch>
</batches>
        </batchSchedule >
    </body>
</agentJobData>
```

Example 3

A BadTripLocator job that has four intervals and runs on tomorrow's schedule within schedule type 1. The first interval says to bump trips with a cost of 1000 but that it should try to reschedule them first if it can reschedule them at less than the bump cost (<resched> option is set to 1). The first interval also says that if the cost is above 800 but below the bumpCost of 1000 then it should try to reschedule the trip at below its current cost.

In the second interval it bumps trips with a cost over 800 (but not try to reschedule them) and will try to reschedule trips with a cost between 400 and 800. The third interval bumps trips with a cost over 400 and attempt to reschedule trips with a cost between 200 and 400. Finally, the fourth interval attempts to reschedule trips with a cost over 100 but will not try to bump them.

Notice that, in the 2 to $4^{th}$ intervals, <resched>0</resched> is specified because trip reschedulings over the bump costs are not attempted since the previous interval would already have tried that.

```
<agentJobData tcftype="11">
    <header tcftype="11"/>
    <body tcftype="11">
        <badTripLocator tcftype="11">
            <schedule>
                <schId>0</schId>
                <schTypeId>1</schTypeId>
                <dayOffset>1</dayOffset>
            </schedule>
            <parameters tcftype="11">
                <intervals arrayType="rows">
                    <interval>
                        <bumpCost>1000</bumpCost>
                        <reschedCost>800</reschedCost>
                        <resched>1</resched>
                    </interval>
                    <interval>
                        <bumpCost>800</bumpCost>
                        <reschedCost>400</reschedCost>
                        <resched>0</resched>
                    </interval>
                    <interval>
                        <bumpCost>400</bumpCost>
                        <reschedCost>200</reschedCost>
                        <resched>0</resched>
                    </interval>
                    <interval>
                        <bumpCost>0</bumpCost>
                        <reschedCost>100</reschedCost>
                        <resched>0</resched>
                    </interval>
                </intervals>
            </parameters>
        </badTripLocator>
    </body>
</agentJobData>
```

The scheduling server 20 reviews the schedule's efficiency on a regular, pre-defined frequency, but can also be triggered by various events. During these reviews, the scheduling server 20 searches for trips that either have a "cost" above a threshold or have schedule violations that exceed the allowable level. Once these trips have been identified, the scheduling server 20 recosts the trips. If a solution is found that is lower that a threshold, the scheduling server 20 reschedules the trip. The scheduling server 20 also can "bump" a trip from the schedule. Such bumped trips may be reinserted into the schedule at a later time, or may be excluded from scheduling (i.e., redirected to another travel means or cancelled altogether).

By evaluating the demand-response transit schedule during the course of its performance, the schedule can be continually re-optimized (i.e., adjusted) to compensate for any inefficiencies/inadequacies as they arise. If a trip cost exceeds a user-defined threshold, the trip can be deemed inefficient and may be "bumped".

While the invention has been described with specificity to a particular embodiment, other implementations will occur to those skilled in the art. For example, while the scheduling server 20 has been described as a single physical computer, it will be appreciated that two or more computers can collaboratively provide the same functionality. In one embodiment, the scheduling server utilizes an external itinerary-planning system for generating itineraries.

In addition, the scheduling server can be configured to enable multiple providers to employ the same scheduling software system with their own scheduling strategies, at the same time.

Computer-executable instructions for implementing the scheduling software system on a computer system could be provided separately from the computer system, for example, on a computer-readable medium (such as, for example, an optical disk, a hard disk, a USB drive or a media card) or by making them available for downloading over a communications network, such as the Internet.

One or more portions of the method may be executed by third parties. For example, the itinerary-planning may be performed via a third-party system.

The above-described embodiments are intended to be examples of the present invention and alterations and modifications may be effected thereto, by those of skill in the art, without departing from the scope of the invention that is defined solely by the claims appended hereto.

What is claimed is:

1. A method for adjusting a demand-response transit schedule, comprising:
    reviewing by a computer processor executing computer readable instructions stored on a non-transitory computer readable medium a demand-response transit schedule during performance of said demand-response transit schedule;
    detecting by said computer processor that said demand-response transit schedule may need to be adjusted by determining how said demand-response transit schedule fits received trips requests for a time period covered by said demand-response transit schedule wherein the determining comprises:
        calculating by said computer processor one or more scores for said demand-response transit schedule; and
        assessing by said computer processor if any of said scores exceeds one or more thresholds; and
    adjusting by said computer processor said demand-response transit schedule if any of said scores exceed one or more thresholds.

2. The method of claim 1 wherein the one or more scores comprise a score for a first run of the demand-response transit schedule and said score is a weighted value of characteristics of said first run.

3. The method of claim 2 wherein the one or more thresholds comprise a first bump cost and a first reschedule cost and wherein the adjusting further comprises:
    bumping the first run if the score exceeds the first bump cost; and
    rescheduling the first run if the score exceeds the first reschedule cost.

4. The method of claim 3 wherein the one or more thresholds further comprise one or more schedule violation levels and wherein the adjusting further comprises:
    rescheduling the run if the score exceeds one or more schedule violation levels and a solution is found with a second score that is lower than the one or more schedule violation levels; and
    bumping the run if the second score is not lower than the one or more schedule violation levels.

5. The method of claim 4, wherein said characteristics include at least one of: distance, time, passenger on-board time, back-tracking, and slack time.

6. The method of claim 4, wherein said characteristics include at least one of: arriving early for a trip, arriving late for a trip, exceeding a maximum on-board time for a passenger, hostage time, exceeding a vehicle capacity, and exceeding a seating capacity.

7. The method of claim 1 wherein the one or more scores comprise a score for the overall demand-response transit schedule.

8. The method of claim 7, wherein said characteristics include at least one of: distance, time, passenger on-board time, back-tracking, slack time, the number of pull-outs.

9. The method of claim 7, wherein said characteristics include at least one of: arriving early for a trip, arriving late for a trip, exceeding a maximum on-board time for a passenger, hostage time, exceeding a vehicle capacity, exceeding a seating capacity.

10. The method of claim 7 wherein the adjusting further comprises:
    rescheduling or bumping runs from the demand-response transit schedule until the score does not exceed the one or more thresholds.

11. A computer system for adjusting a demand-response transit schedule, comprising:
    a non-transitory computer readable medium storing a demand-response transit schedule and computer-executable instructions;
    a processor executing said computer-executable instructions; said computer-executable instructions including instructions for reviewing a demand-response transit schedule during performance of said demand-response transit schedule, detecting that said demand-response transit schedule may need to be adjusted by determining how said demand-response transit schedule fits received trips requests hr a time period covered by said demand-response transit schedule wherein the determining comprises:
        calculating one or more scores for said demand-response transit schedule; and
        assessing if any of said scores exceeds one or more thresholds; and
    adjusting said demand-response transit schedule if any of said scores exceed one or more thresholds.

12. The computer system of claim 11, wherein said processor calculates a score for a said demand-response transit schedule, and determining if said score exceeds a threshold.

* * * * *